L. B. DOE.
COUPLING DEVICE FOR TRAILERS.
APPLICATION FILED OCT. 1, 1917.

1,294,244.

Patented Feb. 11, 1919.

INVENTOR
LORING B. DOE
per A. S. Paré
ATTORNEY

UNITED STATES PATENT OFFICE.

LORING B. DOE, OF SAN FRANCISCO, CALIFORNIA, ASSIGNOR TO MOTOR TRAILER COMPANY, A CORPORATION OF NEVADA.

COUPLING DEVICE FOR TRAILERS.

1,294,244.

Specification of Letters Patent. Patented Feb. 11, 1919.

Application filed October 1, 1917. Serial No. 194,273.

*To all whom it may concern:*

Be it known that I, LORING B. DOE, a citizen of the United States, residing in the city and county of San Francisco, State of California, have invented certain new and useful Improvements in Coupling Devices for Trailers, whereof the following is a specification.

This invention relates to automobile trailers, and more particularly to the connection between the trailer and the motor.

In carrying out the invention I join the automobile and the trailer by two draft connections, one near each side of the vehicles, such device being of such nature that they will both act as draft bars when the vehicles are moving straight ahead, but in rounding a curve the one on the inside of the curve will buckle, or shorten, and the pull be performed by the other. Intermediate these draft connections, and preferably centrally of the vehicles, I arrange a guide bar or tongue, which causes the trailer to follow in the track of the motor vehicle, and not wabble from side to side, as might otherwise be the case. This tongue bar is attached firmly to the motor vehicle, but is capable of a longitudinal movement with respect to the trailer, and is provided with a buffer spring to cushion its rearward yielding, thus preventing jerks and rattle, and also serving to cushion the push of the trailer in going down hill, or in sudden stops, slowing of the motion.

In the accompanying one sheet of drawing I have shown so much of an automobile and a trailer as is necessary to an understanding of the invention.

Figure 1:
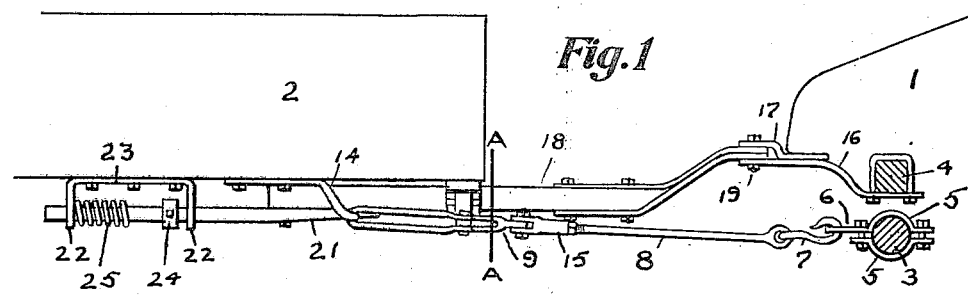
Figure 1 is a side elevation.
Figure 2:
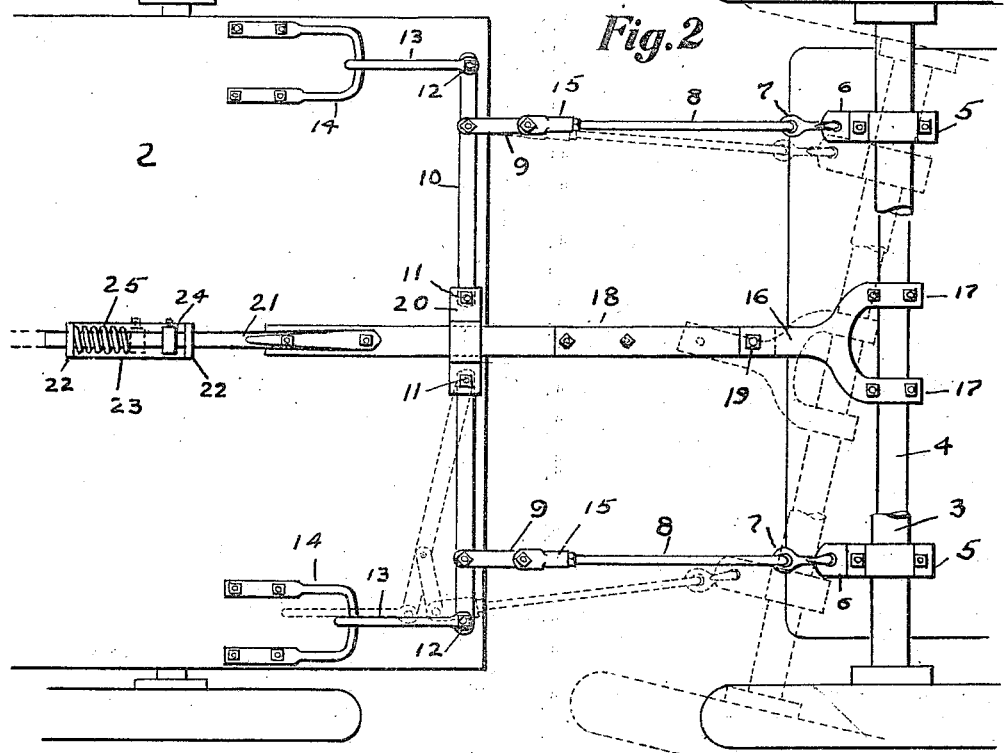
Fig. 2 is a plan view from underneath.
Figure 3:
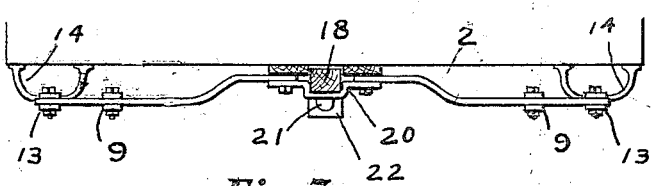
Fig. 3 is a cross section, looking backward, taken at the line A, A, of Fig. 1.

In the figures:—The automobile is diagrammatically represented at 1, and the trailer at 2. 3 may be the axle of the automobile, and 4 a bar applied thereto for the purpose which will be hereinafter indicated.

Upon the axle 3 are clips 5, each provided with a backward projecting perforated tongue 6. Into this perforation is engaged the hook 7 on the forward end of the draft bar 8. The rear end of the draft bar is attached by means of a short link 9 to a laterally extending bar 10, which is pivoted at 11 to the trailer, and at its opposite end 12, to a slotted link 13. The link 13 engages a staple 14 attached to the body of the trailer vehicle. A turnbuckle 15 may be applied to the bar 8 for purpose of adjustment.

Connected to the bar 4, by means of a clip or otherwise, is the rearward extending member 16, which has a forked end at 17 for the convenient attachment of the guide tongue 18, by the pin 19, upon which the tongue may pivot. The tongue 18 extends back through the strap 20 on the trailer vehicle. At its rear end the tongue 18 may be conveniently terminated by a rod 21, which passes through the arms 22 of a bracket 23 attached to the trailer. Between the bracket arms 22 the rod 21 is provided with a collar 24, and between the collar 24 and the rear arm 22 is a spring 25.

In operation, the positions of the several parts are indicated by the full lines in the drawing when the vehicles are moving straight ahead. If, now, the vehicles round a curve, as indicated, for example, by the dotted lines, the draft bar 8, upon the outer side of the curve, will maintain the position indicated by the full lines and the draft bar upon the inner side of the curve will assume the position shown in the dotted lines, in which the link 13 pushes back on the staple 14, and to reduce the degree of this motion, the link 9 swings sidewise, thus virtually shortening the draft bar of which it is a part. At the same time the guide tongue 18 will push back through the stirrup strap 20, and may even go so far that the collar 24 contacts and perhaps compresses the cushion spring 25, as indicated by the dotted lines.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit of the invention. What I claim and desire to secure by Letters Pat- ent of the United States, is the following, to-wit:—

1. A trailer connection for motor vehicles comprising two parallel draft devices, one on each side of the vehicle, and a guide tongue intermediate the same and extending beneath said trailer.

2. A trailer connection for motor vehicles comprising yielding draft devices at each side of the vehicle, and a stiff guide tongue intermediate the same, means connecting said tongue to the trailer and preventing its lateral movement while leaving it movable longitudinally.

3. A trailer for motor vehicles having a non-draft guide tongue and independent draft means, said members adapted to be connected to the motor vehicle.

4. A trailer for motor vehicles having a guide tongue, an independent draft means, said tongue adapted for longitudinal movement with respect to the trailer and provided with a buffer to cushion its rearward motion.

5. A trailer connection for motor vehicles comprising draft devices having pull-bars connected at one end to said vehicle and adjustable means at the opposite ends to connect said devices to said trailer and a longitudinally movable guide tongue therebetween.

6. A trailer connection for motor vehicles comprising draft devices having pull-bars connected to pivoted lateral extending links on the trailer and means for adjusting said pull-bars to said extending links and a longitudinally movable guide tongue therebetween.

In testimony that I claim the foregoing I have hereto set my hand in the presence of two witnesses, this 19th day of Sept., 1917.

LORING B. DOE.

Witnesses:
MARY C. RICKER,
FLORENCE L. WOLFE.